C. E. BALLOU.
RAIL JOINT.
APPLICATION FILED AUG. 20, 1913.

1,104,864.

Patented July 28, 1914.

WITNESSES

C. E. Ballou, INVENTOR

BY

ATTORNEYS

UNITED STATES PATENT OFFICE.

CHARLES E. BALLOU, OF ROANOKE, VIRGINIA, ASSIGNOR TO BALLOU SAFETY RAIL JOINT COMPANY, OF ROANOKE, VIRGINIA, A CORPORATION OF VIRGINIA.

RAIL-JOINT.

1,104,864.   Specification of Letters Patent.   Patented July 28, 1914.

Application filed August 20, 1913. Serial No. 735,747

*To all whom it may concern:*

Be it known that I, CHARLES E. BALLOU, a citizen of the United States, residing at Roanoke, in the county of Roanoke and State of Virginia, have invented certain new and useful Improvements in Rail-Joints, of which the following is a specification.

This invention has reference to improvements in rail joints, and its object is to provide a means whereby the fish plates and rails may be securely joined against accidental displacement.

In accordance with the present invention the fish plates are traversed by a bolt having a nut with a greatly elongated shank, so that when the nut is applied to the body of the bolt the shank of the nut will project through a fish plate and in part or wholly through the web of the rail, the latter having a hole through it of greater diameter than the part of the shank of the nut traversing it, and, moreover, the body of the nut will then be in spaced relation to the corresponding fish plate. The shank of the nut is tapered at an acute angle to the longitudinal axis of the nut and the fish plate where traversed by the shank of the nut is similarly tapered, so that when the nut is screwed tight the taper portion of the shank is lodged firmly in the fish plate against any liability of turning, and hence accidental displacement of the nut is avoided and even should it occur, as it sometimes happens in cases of derailment that the nuts are sheared off, the shanks of the nuts still hold firmly and the rails are not displaced.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

Figure 1:
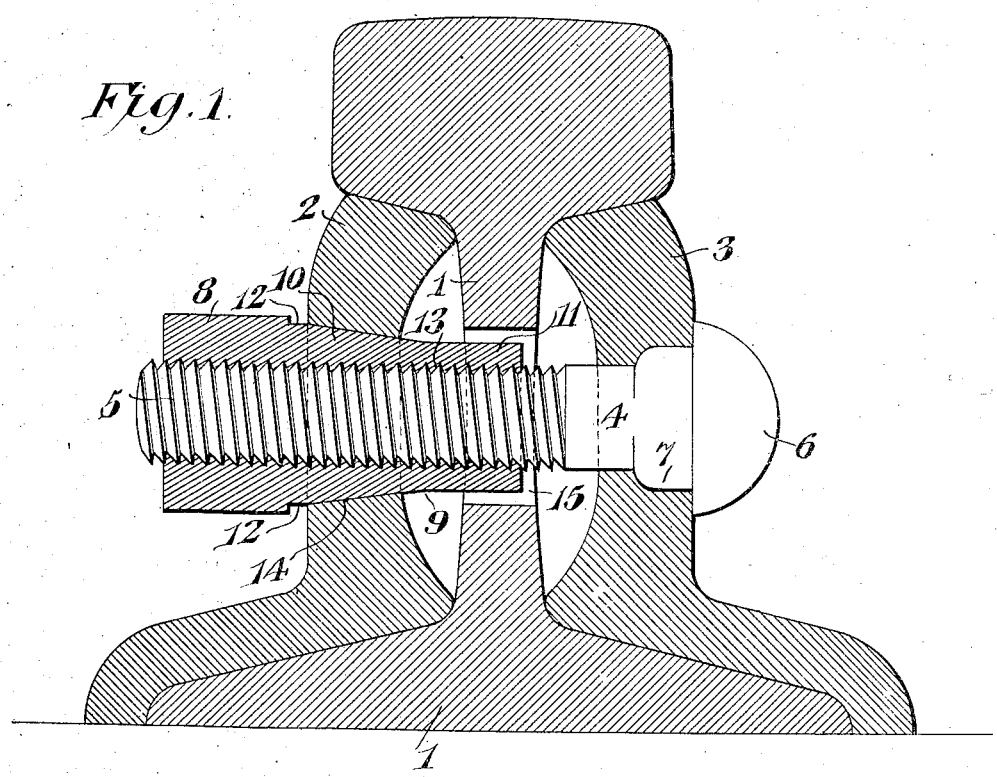
Figure 2:
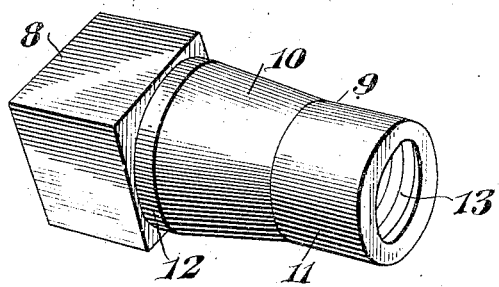

In the drawings:—Figure 1 is a cross section of a rail in line with one of the bolts, the body of the latter being shown in elevation. Fig. 2 is a perspective view of a nut provided with an elongated axial shank.

Referring to the drawings, there is shown a rail 1 which may be taken as typical of any ordinary railroad rail, and on opposite sides of the rail are shown fish plates 2, 3, respectively, and in general these fish plates may follow the usual practice.

Both the fish plates and rail are traversed by passages, as is customary for holding bolts, but these passages, as will hereinafter appear, are somewhat different from the ordinary fish plates and rails.

There is provided a bolt 4 having a threaded shank 5 and at one end a head 6 and the shank 1 joining the head may have lateral projections 7 adapted to seat in the fish plate 3 to prevent the bolt body from turning. Of course, other means may be adopted for preventing the turning of the bolt, so that the showing of the drawings may be taken as more or less indicative of any suitable means.

There is provided a nut 8 which so far as its body portion is concerned, may be similar to nuts as usually employed in connection with bolts. The nut 8, however, differs from the ordinary nut in that it is provided with an axial extension 9 on one side, this extension including an intermediate taper portion 10 and a free end 11 of less diameter than the portion 12 connected directly to one face of the nut 8. The usual threaded bore of the nut is continued through the axial extension 9 and terminates at the outer end of the extension 11, as indicated at 13.

The fish plate 2 has a tapered passage 14 formed therethrough for the taper portion 10 of the nut extension 9, and this extension is long enough to extend in part through a passage 15 formed through the web of the rail 1, this passage 15 being of sufficiently large diameter to accommodate the end 11 and permit some relative movements of the rails with respect to the fish plates, thus providing for expansion and contraction of the rails under changing temperatures.

The taper 10 is but little removed from parallelism with the longitudinal axis of the nut, so that it is at an extreme acute angle thereto, the taper being relatively slight and the portion 10 being relatively long. Now, when the bolt 4 is passed through the two fish plates and the nut is applied, the extension 9 is screwed along the threaded end 5 of the bolt until the end 11 enters the opening 15 and the taper portion 10 is seated in the taper passage 14 through the fish plate 2. On turning the nut to draw the fish plates into tight relation to the rail, the taper portion 10 seats very firmly in the passage 14 leaving the body of the nut 8 somewhat spaced from the fish plate 2, while the end 11 extends into the passage 15, and if long enough, through it.

The taper portion 10 is so acute that it jams very tightly into the taper portion 14 when the fish plates have been drawn against the rail with the desired force, and hence the nuts do not loosen under ordinary conditions of use.

The axially elongated nut serves to greatly strengthen the bolt where it is threaded, and consequently where it is weakest, for the nut when screwed up tight may reach nearly to the solid portion of the shank of the bolt instead of being entirely or mostly exterior to the fish plate.

It is the usual practice in rail joints to reverse the bolts, that is, half of the bolts are passed through the fish plate and rail in one direction, and the other half in the other direction, so that should it transpire that a train is derailed and the flanges of the wheels cut off, the nuts of the bolts of one side, the nuts of the bolts on the other side continue to hold the rails together. Should the same accident occur with the present invention, the bodies of the nuts 8, may be sheared off, but the shanks or extensions of these nuts still hold firmly in the fish plates and the joint is as strong as though no such accident had occurred, while with the ordinary bolts the joint is greatly weakened. Derailment of a train causing the shearing off of the nuts of the bolts, even should it occur on both sides of the rail joint, would have no bad effect at all upon the joint, but the latter would be as strong as before. Moreover, the greatly elongated nut due to its axial extension or shank on one side having a taper portion tightly fitting a taper hole in the fish plate, not only gives great strength and durability, but affords a protection from weather and other like effects, and adds greatly to the life of the bolt. Again the tighter the nut is screwed up the more firmly it holds to the threaded portion 5 of the bolt, and the long taper seat in the passage 14 holds the nut from turning. Again, the more weight placed upon the structure the tighter it becomes.

The only essential change needed in the fish plates and rails is the formation of the taper holes 14 and the enlarging of the holes 15 which are made of greater diameter than those intended simply for the passage of the shank of the bolt.

The arrangement has been described with particular reference to a rail joint, and is particularly useful in such connection, but this does not preclude the use of a bolt embodying the present invention in conjunction with other parts to be held together.

From actual tests upon a railroad under traffic conditions it has been found that on screwing the taper part 10 of the nut into the taper seat in the fish plate the frictional binding becomes sufficiently great to hold the fish plate and rail in a tight grip, and also hold the nut in place, so that it will not turn in the least except when purposely turned by a wrench, still the binding of the fish plate and rail is not so tight but that the rail may contract and expand under temperature changes without loosening the bolt and nut. Furthermore, this may be regulated as desired. When the taper portion of the nut is screwed into the seat in the fish plate the frictional binding is so much greater in the taper portion than in any other part of the bolt that vibration or movement caused by passing trains and the sinking of the joint under the weight of the train will be either at the head of the bolt or in the thread. When the joint again rises to its natural place after the passage of the train it is not moved in the least and consequently remains tight and in place even though there be sufficient looseness to allow for expansion and contraction under temperature changes.

The bolts being always tight and on duty, the adjacent ends of the rails are held perfectly even, so that when the wheels of the train pass over them the ends of the rails are not worn off or mashed so as to cause a bump, but remain just like any other part of the rail. The result of this is that the life of the rail is prolonged and there is a material saving in rolling stock and in the power necessary to pull the train.

Because the bolts always hold tight as placed, a less number of bolts are necessary to do the work than is the case with bolts as ordinarily used, and four bolts will perform better service than six bolts of the common type.

When the joint is once properly placed it requires but little attention and does not have to be constantly inspected, and, moreover, practically eliminates wrecks now caused by bad joints and loose nuts.

What is claimed is:—

1. A rail joint comprising fish plates and bolts, each bolt extending through the fish plates and a rail between them, and a nut for each bolt having a shank portion extending axially from one face of the nut and formed with an acute taper part of an axial length to extend through a fish plate, and the fish plate where traversed by the nut having a conical passage therethrough in size and shape corresponding to the taper portion of the nut to provide a tight fit throughout the thickness of the fish plate.

2. A rail joint comprising fish plates and bolts extending through the fish plates and a rail between them, and a nut for each bolt having a shank portion axially extending from one face of the nut and provided with an elongated acute-taper conical part, and the fish plate where traversed by the nut having a conical passage in size and shape conforming to the taper portion of the nut to provide a tight fit throughout the thickness of the fish plate, the axial extension of the nut being of a length to extend into the web of the intervening rail.

3. A rail joint comprising fish plates adapted to the meeting ends of rails, and bolts extending through the fish plates and intervening rails, each bolt being provided with a nut having a shank extending axially from one face and said shank having end portions of different diameters with an intermediate conical part tapering away from the body of the nut at an acute angle to the longitudinal axis thereof and the corresponding fish plate being provided with a conical passage in size and shape conforming to the conical portion of the shank of the nut, and that portion of the shank of the nut remote from the body of the nut being of a length to extend into the web of the rail between the fish plates.

4. A rail joint comprising fish plates adapted to the meeting ends of rails, and bolts extending through the fish plates and intervening rails, each bolt being provided with a nut having a shank extending axially from one face and said shank having end portions of different diameters with an intermediate conical part tapering away from the body of the nut at an acute angle to the longitudinal axis thereof and the corresponding fish plate being provided with a conical passage in size and shape conforming to the conical portion of the shank of the nut, and that portion of the shank of the nut remote from the body of the nut being of a length to extend into the web of the rail between the fish plates, said rail web having the passage for the end of the nut shank of a diameter to leave a free space thereabout.

5. A bolt having a threaded shank and a nut adapted thereto, said nut being provided with an elongated shank portion extending axially from one side of the nut and provided with an intermediate part of acute-taper conical form and terminating at the end remote from the nut in a cylindrical extension of less diameter than the portion of the shank adjacent to the body of the nut.

In testimony whereof I affix my signature in presence of two witnesses.

CHARLES E. BALLOU.

Witnesses:
SAMUEL H. HOGE,
ASHBY WILLIAMS.